United States Patent
Byrne

(10) Patent No.: US 8,482,252 B2
(45) Date of Patent: Jul. 9, 2013

(54) DOCKING STATION FOR USE WITH POWER AND DATA CENTER

(75) Inventor: Norman R. Byrne, Ada, MI (US)

(73) Assignee: Byrne Electrical Specialists, Inc., Rockford, MI (US)

( * ) Notice: Subject to any disclaimer, the term of this patent is extended or adjusted under 35 U.S.C. 154(b) by 298 days.

(21) Appl. No.: 12/997,166

(22) PCT Filed: Jun. 9, 2009

(86) PCT No.: PCT/US2009/003466
§ 371 (c)(1),
(2), (4) Date: Dec. 9, 2010

(87) PCT Pub. No.: WO2009/151577
PCT Pub. Date: Dec. 17, 2009

(65) Prior Publication Data
US 2011/0095724 A1    Apr. 28, 2011

Related U.S. Application Data

(60) Provisional application No. 61/131,403, filed on Jun. 9, 2008.

(51) Int. Cl.
*H02J 7/00* (2006.01)
*H05K 5/00* (2006.01)

(52) U.S. Cl.
USPC ............. 320/115; 320/113; 361/679.01

(58) Field of Classification Search
USPC ............. 320/115, 113; 361/686, 640
See application file for complete search history.

(56) References Cited

U.S. PATENT DOCUMENTS

| | | | |
|---|---|---|---|
| 6,926,130 B2 | 8/2005 | Skowronski | |
| 7,230,822 B2 | 6/2007 | Langberg | |
| 7,247,032 B2 | 7/2007 | Merz | |
| 7,272,420 B2 | 9/2007 | Falcon | |
| 7,347,723 B1 * | 3/2008 | Daily | 439/519 |
| 7,352,567 B2 | 4/2008 | Hotelling | |
| 8,090,130 B2 * | 1/2012 | Zorkendorfer et al. | 381/334 |
| 2003/0172218 A1 | 9/2003 | Scott | |
| 2004/0014336 A1 | 1/2004 | Merz | |
| 2004/0092139 A1 | 5/2004 | Merz | |
| 2004/0212822 A1 | 10/2004 | Schinner | |
| 2005/0190542 A1 | 9/2005 | Chee | |
| 2006/0066753 A1 | 3/2006 | Gennetten | |
| 2006/0116009 A1 | 6/2006 | Langberg | |
| 2006/0138258 A1 | 6/2006 | Jarvinen | |
| 2006/0197753 A1 | 9/2006 | Hotelling | |
| 2006/0250764 A1 | 11/2006 | Howarth | |
| 2007/0035917 A1 | 2/2007 | Hotelling | |
| 2007/0047198 A1 | 3/2007 | Crooijmans | |
| 2007/0230723 A1 * | 10/2007 | Hobson et al. | 381/300 |
| 2008/0002355 A1 | 1/2008 | Carnevali | |
| 2008/0164845 A1 * | 7/2008 | Choi | 320/115 |
| 2008/0232042 A1 * | 9/2008 | Yoshioka | 361/679 |

* cited by examiner

*Primary Examiner* — M'Baye Diao
(74) *Attorney, Agent, or Firm* — Varnum, Riddering, Schmidt & Howlett LLP

(57) ABSTRACT

A docking station (100) is adapted for charging or otherwise transmitting electrical signals to an electronic device (240). The docking station (100) includes a main housing (102) and a device connector assembly (204). The device connector assembly (204) is coupled to the main housing (102) and electronically connected to circuit components (130, 132) for mechanically and electrically coupling the electronic device (240) to the docking station (100).

17 Claims, 14 Drawing Sheets

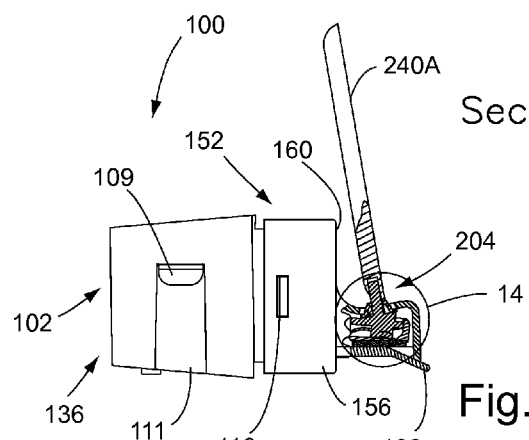 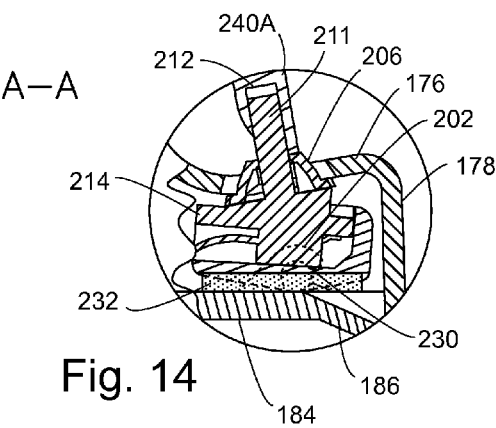
Fig. 13  Fig. 14
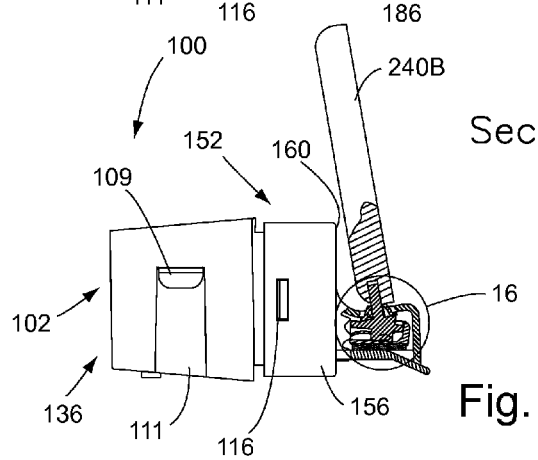 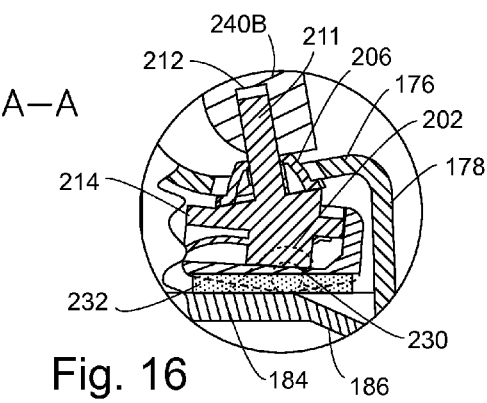
Fig. 15  Fig. 16
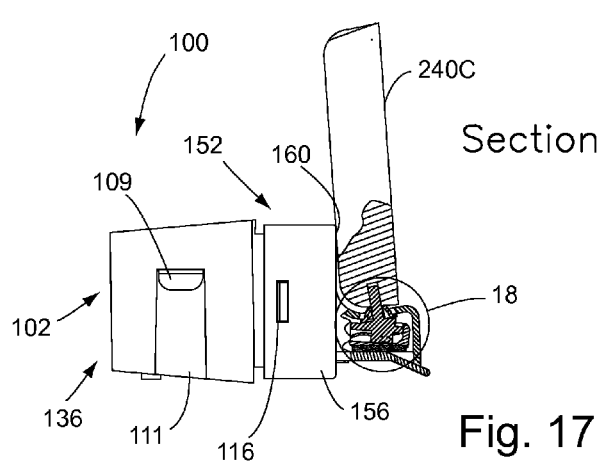 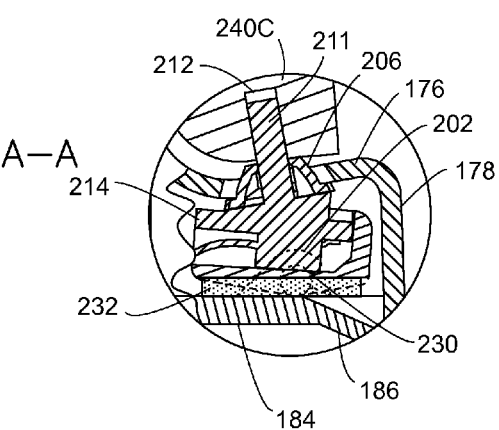
Fig. 17  Fig. 18

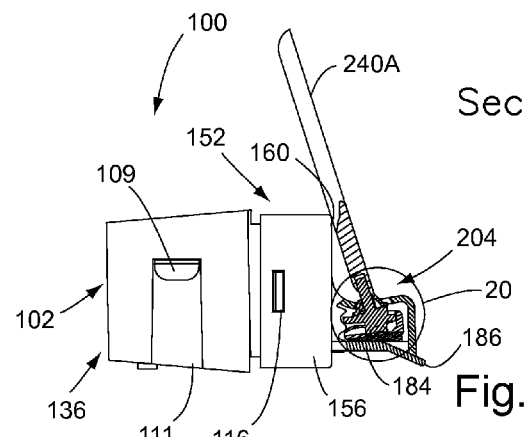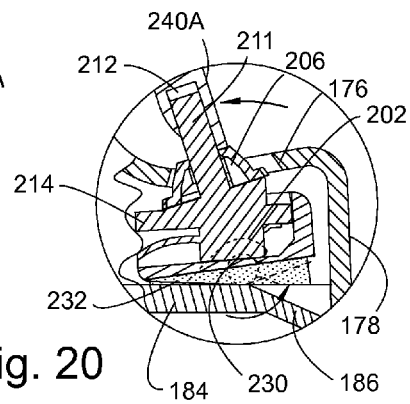
Fig. 19   Fig. 20
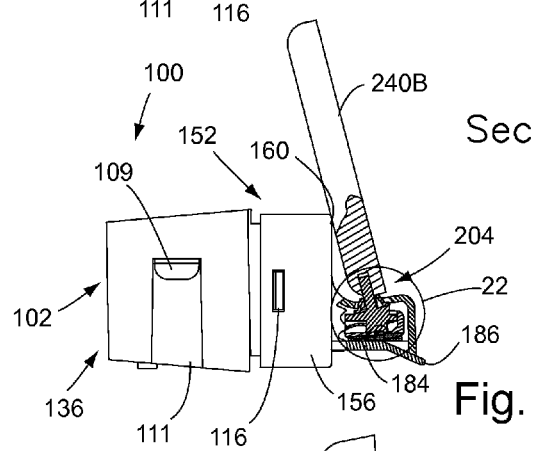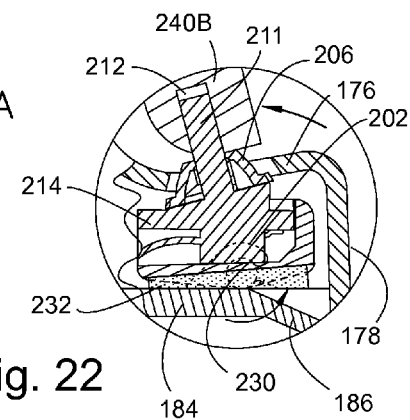
Fig. 21   Fig. 22
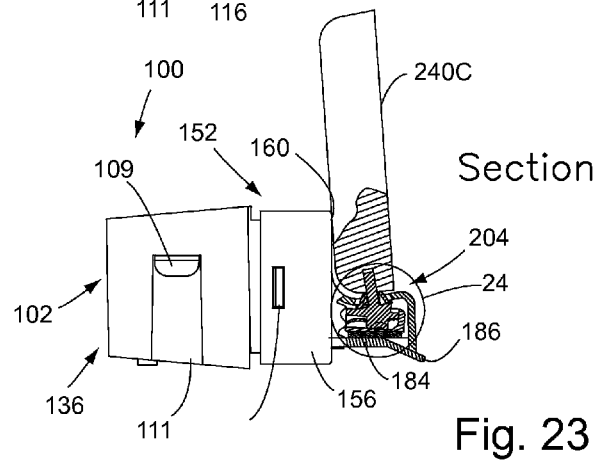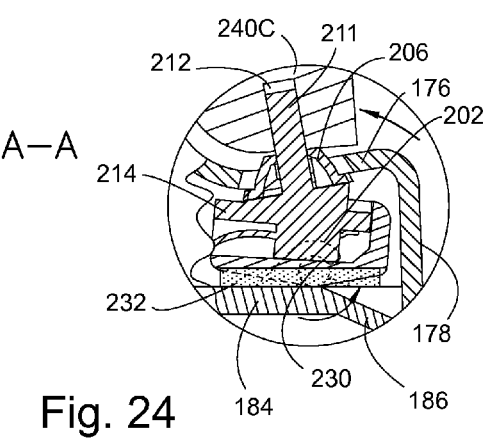
Fig. 23   Fig. 24

Section B-B

Section B-B

Section B-B

SECTION C1—C1

SECTION C2—C2

DOCKING STATION FOR USE WITH POWER AND DATA CENTER

CROSS-REFERENCE TO RELATED APPLICATIONS

This application claims priority of U.S. Provisional Application Ser. No. 61/131,403 filed Jun. 9, 2008.

STATEMENT REGARDING FEDERALLY SPONSORED RESEARCH OR DEVELOPMENT

Not applicable.

PARTIES TO A JOINT RESEARCH AGREEMENT

Not applicable.

REFERENCE TO A SEQUENCE LISTING

Not applicable.

BACKGROUND OF THE INVENTION

1. Field of the Invention

The invention relates to apparatus for charging or otherwise transmitting electrical signals to or from a device to be removably connected to the apparatus and, more particularly, to a universal docking station adapted for use with a power and data center, and further adapted for charging or otherwise transmitting electrical signals to or from a device such as a hand held electronic device.

2. Background Art

In today's electronic world, numerous types of portable electronic devices are now used for both commercial and personal purposes. These devices include such items as cell phones, personal data assistants (commonly referred to as "PDA's") and iPOD's® (a registered trademark of Apple Computer, Inc.). These various types of hand held devices often operate on DC power with internal rechargeable batteries. Accordingly, the hand held devices must be recharged from time to time.

In addition to charging, hand held devices (particularly those in the form of PDA's or other types of computers) may require the capability of transmitting and receiving data from other types of electronic devices, such as laptop computers and the like. However, hand held devices typically do not offer the most "user-friendly" input/output elements, such as keyboards and a mouse typically found with personal computers. Instead, a user has often been required to be content with using a stylus or other data entry device. Accordingly, it is desirable to provide a device which has the capability of integrating the convenience of a hand held instrument into a PC-type input/output environment, such as exists with respect to requiring data entry from a hand held device into a personal computer in the form of a "download."

Various types of docking stations for providing for charging of hand held devices or otherwise providing for data entry are relatively well known in the prior art. For example, Scott, et al., United States Patent Application Publication No. 2003/0172218 published Sep. 11, 2003, describes various types of systems, devices and methods for transferring data between an intelligent docking station and a hand held personal computer. The Scott, et al. application publication discloses a method for receiving a device-enabled data element at a docking station. A driver conversion is utilized to convert the device-enabled data element into a bus-enabled data element. The bus-enabled data element is placed on a hand held compatible bus. The method includes the transmission of a data packet by detecting an input packet, retrieving a packet identifier from the input packet and dispatching the input packet to a device driver enabled on the packet identifier. The device driver is capable of converting the input packet from a hand held computer packet type to a device packet type.

The Scott, et al. application further describes what is characterized as an "intelligent docking station" ("IDS") operating system, utilizing a top-level device driver. The device is capable of assembling hand held device-enabled data elements on an input packet, and formatting IDS device-enabled data elements for the hand held low-level device driver on an output packet. A communication driver sends and receives bus-enabled data elements, while a low-level device driver controls peripheral devices with device-enabled data elements. The operating system is enabled to assemble data elements from the communication driver, and format the data elements for the low level device driver.

The intelligent docking station includes a co-processor capable of converting a hand held-enabled data element into a device enabled data element, a bus interface coupled to the co-processor, and a port coupled to the co-processor. Methods performed in accordance with the disclosure of the application publication may be performed with the use of computer diskettes, CD ROM's, or other memory devices. The entire system may be set up as a network capable of operating on the Internet, and employing an application service provider. The system may also be embodied such that one or more data signals are utilized to transform a general network into a task-specific network.

One problem associated with a number of known docking stations is that they are sized and structured to accommodate only one type and size of hand held device. Accordingly, if a user has various types of cell phones which vary in thickness or other dimensions, separate and distinct docking stations will be required for charging of each individual cell phone.

This problem has been somewhat recognized and at least partially addressed in the prior art. For example, Crooijmans, et al., U.S. Patent Application Publication No. 2007/0047198 published Mar. 1, 2007 discloses a specific configuration for a docking station for hand held electronic devices. Although the docking station is a single unit, the station utilizes a plurality of inserts which can be placed in the docking station, so that the station can accommodate hand held devices with differing sizes and shapes.

In one embodiment, the docking station includes a top member with a cavity formed therein. The cavity is configured to rotatably receive a removable insert which accommodates the bottom end of a hand held device of a particular size and shape. In a further embodiment, the docking station includes a removable insert for receiving hand held devices with varying sizes and shapes. The removable insert includes a basin with an opening and an enclosed region which receives the bottom end of the hand held device. The basin is configured for rotatable insertion and extraction to and from the docking station. The removable insert rotates between an initial position, where the insert is capable of being inserted or extracted, and a mounted position, where the removable insert is inserted in the docking station.

In a further embodiment, the docking station includes a connector disposed in the cavity of the top member. The connector protrudes through a bottom wall of the cavity, and the station further includes a collar surrounding and positioned at the base of the connector. The collar protrudes through the bottom wall of the cavity with the connector. The collar is configured so as to produce a snug fit, with an opening in the removable insert when the insert is positioned within the cavity of the top member. The opening of the removable insert is configured so as to allow rotation of the insert into the cavity without hitting the connector. Crooijmans, et al. also disclose certain additional elements associated with the inserts. For example, a latching retention mechanism is utilized so as to secure the insert to the docking station, when the insert is rotated into engagement with the station.

Another universal docking station directed to the accommodation of electronic devices having differing sizes and shapes is disclosed in Howarth, et al., U.S. Patent Application Publication No. 2006/0250764 published Nov. 9, 2006. The Howarth, et al. docking station utilizes an adjustable opening capable of expanding to accommodate larger devices and retracting to accommodate smaller devices, while still supporting the portable electronic device in its proper position within the docking station.

The docking station includes a base having a recess which forms an opening for receiving the hand held device. The recess includes sides which surround the sides of the hand held device when the device is received by the opening. One or more adjustable members are disposed at least partially within the recess. The adjustable members have the ability to change the size and shape of the opening. In one embodiment, at least one sliding member is partially located within the recess. The sliding member is configured so as to slide relative to the base along a first axis. The member slides between a retracted position that forms a large opening in the recess for receiving larger hand held devices, and an expanded position that forms a smaller opening in the recess for receiving smaller hand held devices. In a further embodiment, a second adjustable member can be located on a second side of the opening opposite the first side. The second adjustable member cooperates with the first adjustable member so as to adjust the size of the device opening.

One of the problems associated with known docking stations for accommodating hand held devices of differing sizes and shapes relates to stability. When the hand held device is inserted into the docking station, the user will want to ensure that the device is stable and will not tilt in a manner which would cause problems with respect to the electrical interconnection between the hand held device and the docking station. Further, docking stations which are known within the industry are typically structured as "stand alone" devices. That is, the docking stations are not associated with other electrical apparatus, such as power centers or the like. For purposes of efficiency, aesthetics and overall use, it may be advantageous to incorporate a docking station within other apparatus associated with, for example, power distribution and the like.

SUMMARY OF THE INVENTION

In accordance with the invention, a docking station provides for charging or otherwise transmitting or receiving electrical signals to or from an electronic device. The docking station includes a main housing and circuit components positioned within the housing for transmitting and/or receiving electrical signals to and/or from the electronic device. The signals can be in the form of power and/or communication signals. A device connector assembly is provided, which is coupled to the main housing and electrically connected to the circuit components. The device connector assembly releasably, mechanically, and electrically couples the electronic device to the docking station. The device connector assembly is structured so as to accommodate different ones of the electronic devices having differing thicknesses.

In accordance with other concepts, the device connector assembly and the main housing are structured so that when the electronic device is mechanically and electrically coupled to the docking station, the electronic device is prevented from tilting rearwardly to an extent that the mechanical and electrical coupling of the electronic device to the docking station would be disturbed. The device connector assembly includes a pivot assembly which is pivotally coupled to the docking station. In this manner, when the electronic device is mechanically and electrically coupled to the docking station, the pivot assembly will pivot in correspondence with any pivoting motion of the electronic device.

The docking station can include a base door which is coupled to the main housing. The pivot assembly can be directly and pivotally coupled to the base door. The base door can be rotatably coupled to the main housing. The device connector assembly is structured so that when the electronic device is mechanically and electrically coupled to the docking station, the device is initially tilted rearwardly toward the main housing. This tilting assists in providing stability to the electronic device.

The device connector assembly can comprise force means for exerting forces against the electronic device, when the electronic device is mechanically and electrically coupled to the docking station, and disturbing external forces are applied against the docking station. The force means can include a foam block. Alternatively, the force means can include a series of springs. Further, stop means are provided for preventing the electronic device, when the device is coupled to the docking station, from tilting rearwardly to the extent that electrical and/or mechanical connections between the electronic device and the device connector assembly would be disturbed. The stop means can include a forward-most and uppermost edge of a component of the main housing.

More specifically, the device connector assembly can include a connector for electrically connecting the docking station to the electronic device. Electrical means can be provided for electrically connecting the circuit components to the connector. The pivot assembly can be pivotally coupled to the docking station and operably coupled to the connector so as to pivot in unison with the connector. Resilient means are provided which are positioned below the pivot assembly, for exerting forces upwardly against the pivot assembly.

In accordance with other concepts, the docking station includes a rotatable base door coupled to the main housing and capable of movement between an extended position and a retracted position. The rotatable base door is in an extended position when the electronic device is mechanically and electrically coupled to the docking station. The pivot assembly is pivotally coupled to the rotatable base door. The pivot assembly includes a substantially horizontal recessed area. The recessed area is adapted to receive an electrical connector of the electrical means, and a connector base of the connector. Left and right sides enclose the recessed area. A pair of pivot axles extend outwardly from each of the left and right sides, with the axles being rotatably received within pivot slots of the rotatable base door. The pivot assembly is structured so that when one of the electronic devices having a predetermined thickness is inserted onto the connector, an elongated configuration of the electronic device will be positioned slightly away from a front and upper cover edge of the docking station. The resilient means will act so as to urge the electronic device away from the upper cover edge.

The rotatable base door can be positioned in a retracted, closed position. In this position, the device connector assembly is hidden from view. The docking station can also include video and audio connectors. The electronic device can include a cell phone, camera, or personal data assistant.

BRIEF DESCRIPTION OF SEVERAL VIEWS OF THE DRAWING

The embodiments of the invention will now be described with respect to the drawings, in which:

FIG. 13 is a sectional, side view of the docking station and hand-held device illustrated in FIG. 10, and taken along section lines A-A of FIG. 10;

FIG. 14 is an enlarged view of the portion of FIG. 13 circumscribed by circle 14 as shown in FIG. 13;

FIG. 15 is a sectional, side view of the docking station shown in FIG. 10, but further showing a hand-held device having a greater thickness than the device shown in FIG. 13, and with FIG. 15 showing a view along section lines A-A of FIG. 10;

FIG. 16 is an enlarged view of the portion in FIG. 15 circumscribed by circle 16 as shown in FIG. 15;

FIG. 17 is a side, sectional view similar to FIGS. 13 and 15, but showing a hand-held device of an even greater thickness than the hand-held device as shown in FIGS. 13 and 15;

FIG. 18 is an enlarged view of a portion of FIG. 17 circumscribed by circle 18, as referenced in FIG. 17;

FIG. 19 is a side, sectional view of the docking station and a relatively thin hand-held device, taken along section lines A-A of FIG. 10, similar to the view of FIG. 13, and showing the concept that the tilting pressure exerted on the hand-held device cannot cause the device to be tilted beyond a certain angle without abutting the docking station;

FIG. 20 is an enlarged view of a portion of FIG. 19 circumscribed by circle 20, as illustrated in FIG. 19;

FIG. 21 is a side, sectional view similar to FIG. 19, essentially taken along section lines A-A of FIG. 10 but showing the hand-held device as having a relatively greater thickness than that shown in FIG. 19, but also showing the device is prevented from tilting rearwardly beyond a certain angle without abutting the docking station;

FIG. 22 is an enlarged view of FIG. 21 circumscribed by circle 22, as illustrated in FIG. 21;

FIG. 23 is a side, sectional view similar to FIGS. 19 and 21, but showing the hand-held device as having a still greater thickness, taken along section lines A-A of FIG. 10, and again showing that the device is prevented from tilting rearwardly beyond a certain angle without abutting the docking station;

FIG. 24 is an enlarged view of a portion of FIG. 23 circumscribed by circle 24, with circle 24 illustrated in FIG. 23;

DETAILED DESCRIPTION OF THE INVENTION

The principles of the invention are disclosed, by way of example, with respect to a docking station 100 as illustrated in FIGS. 1-39. The docking station 100, and other embodiments in accordance with the invention, efficiently provide for transfer of electrical signals between the docking station 100 and a hand held device, where the electrical signals may be in the form of charging power signals being transmitted to the hand held device or, alternatively, data communication signals or program communication signals between the station 100 and the device. In particular, docking stations in accordance with the invention accommodate hand held devices of differing thicknesses, while still maintaining the devices in stable positions relative to the docking station 100. Further, the configuration of the docking station 100 in accordance with the invention prevents interconnected hand held devices from inappropriately tilting in a manner such that the electrical and mechanical connections between the docking station 100 and the hand held devices are disturbed.

Figure 1:
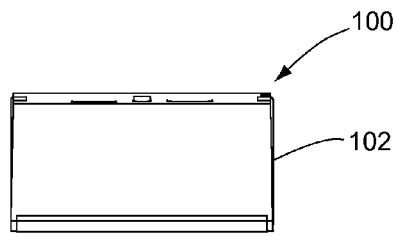
FIG. 1 is a rear, elevation view of a docking station, shown in a stand alone format, in accordance with the invention, and further showing the docking station in a closed or retracted position.
Figure 2:
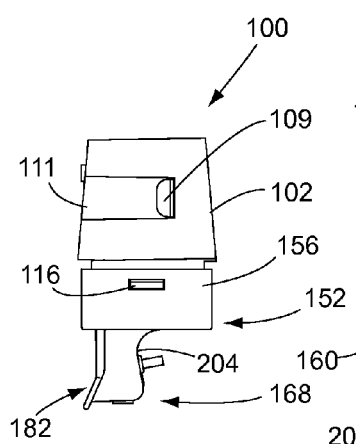
FIG. 2 is a left side, elevation view of the docking station shown in FIG. 1, with the docking station in an open or extended position.
Figure 3:
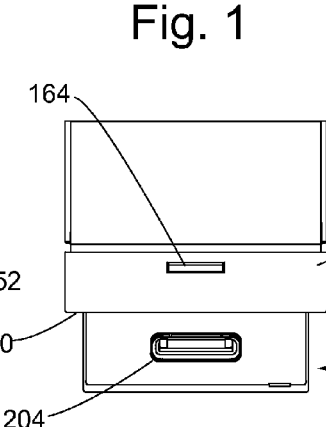
FIG. 3 is a plan view of the docking station shown in FIG. 2.
Figure 4:
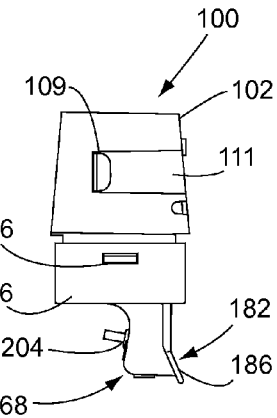
FIG. 4 is a right side, elevation view of the docking station shown in FIG. 2.
Figure 5:
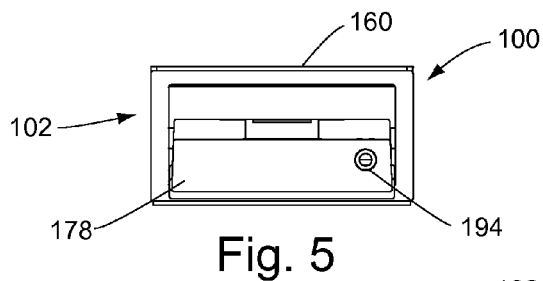
FIG. 5 is a front, elevation view of the docking station shown in FIG. 2.
Figure 6:
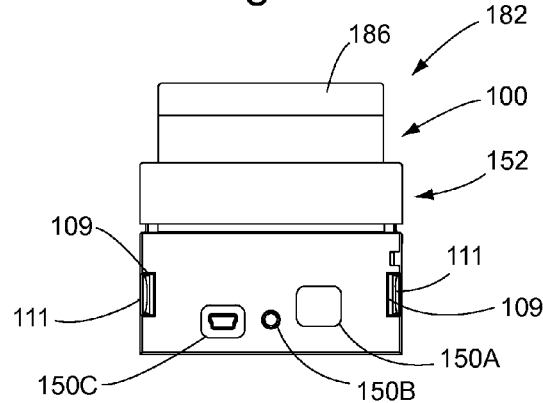
FIG. 6 is an underside view of the docking station shown in FIG. 2.
Figure 7:
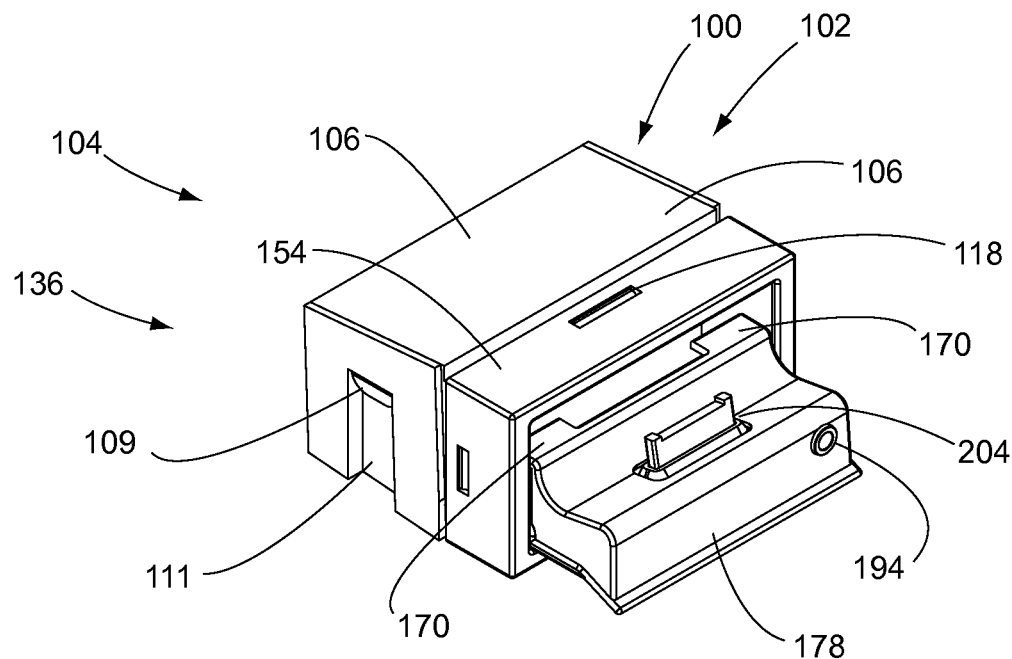
FIG. 7 is a perspective view of the docking station shown in FIG. 1, with the station being in an open, or extended position.
Figure 8:
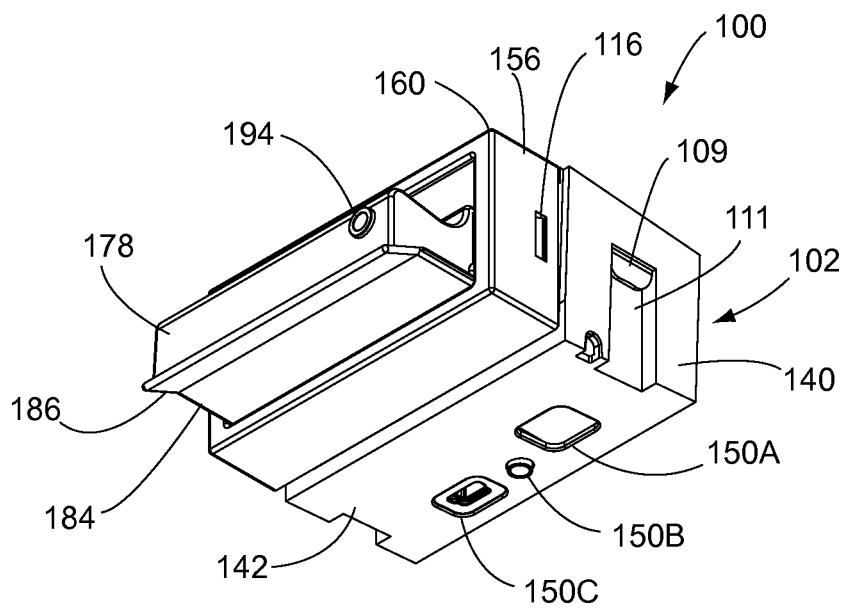
FIG. 8 is an underside, perspective view of the docking station shown in FIG. 7.
Figure 9:
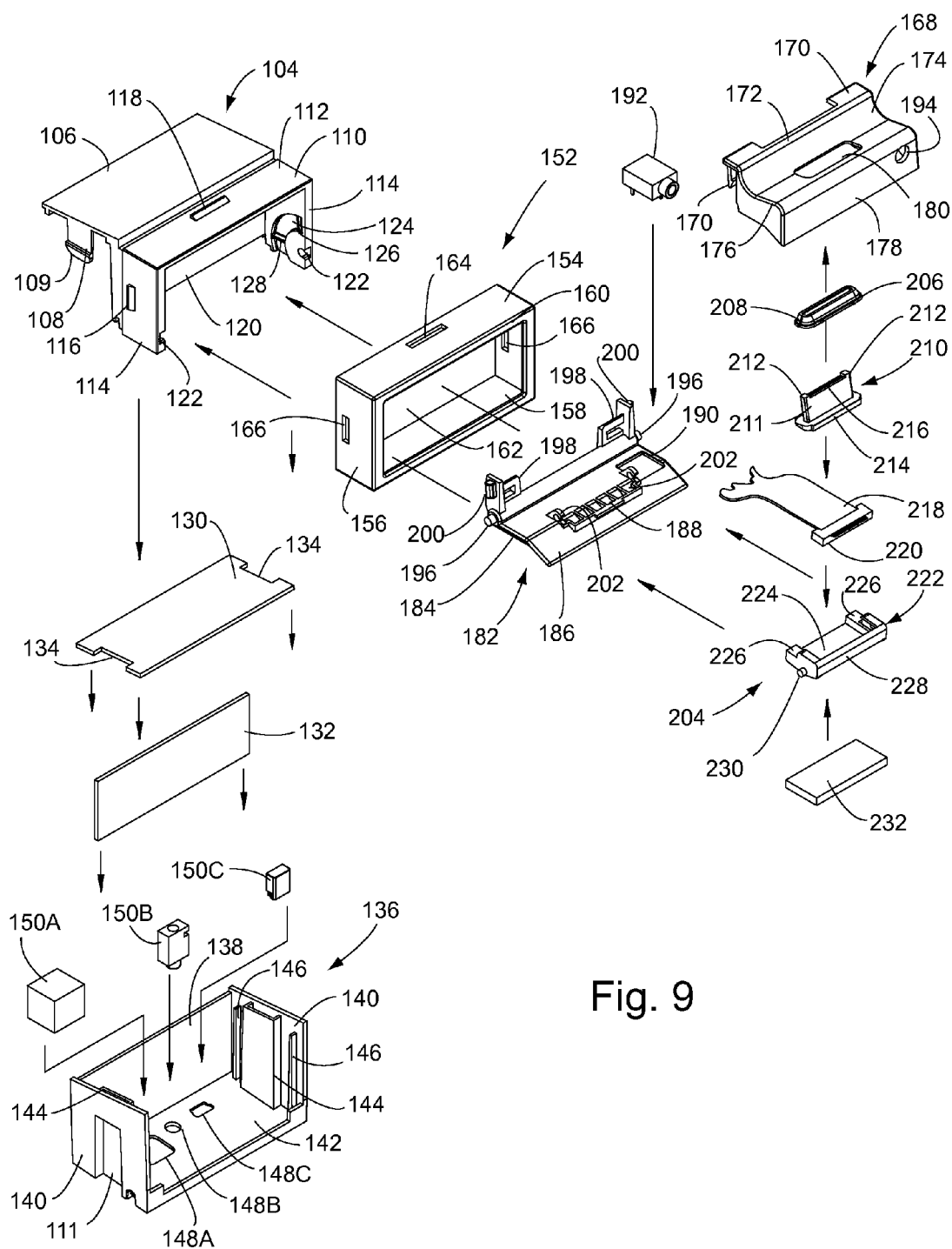
FIG. 9 is a perspective and exploded view of the docking station illustrated in FIG. 7, and showing certain of the individual elements of the docking station.
Figure 10:
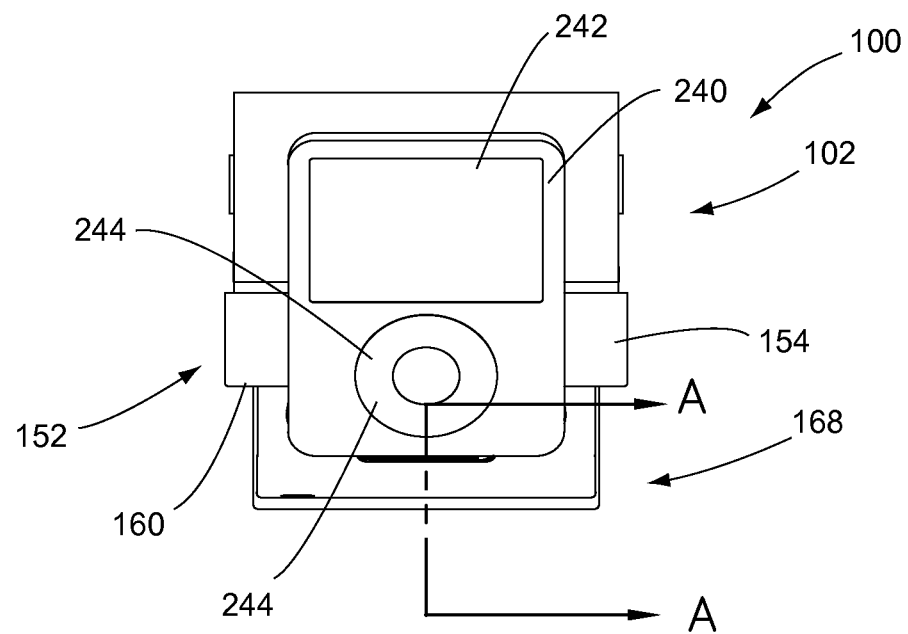
FIG. 10 is a plan view of the docking station illustrated in FIG. 2, with the station electrically connected to an example hand-held device which may be utilized with the docking station, and with FIG. 10 illustrating location of section A-A which is utilized for the drawings consisting of FIGS. 13, 15, 17, 19, 21 and 23.
Figure 11:
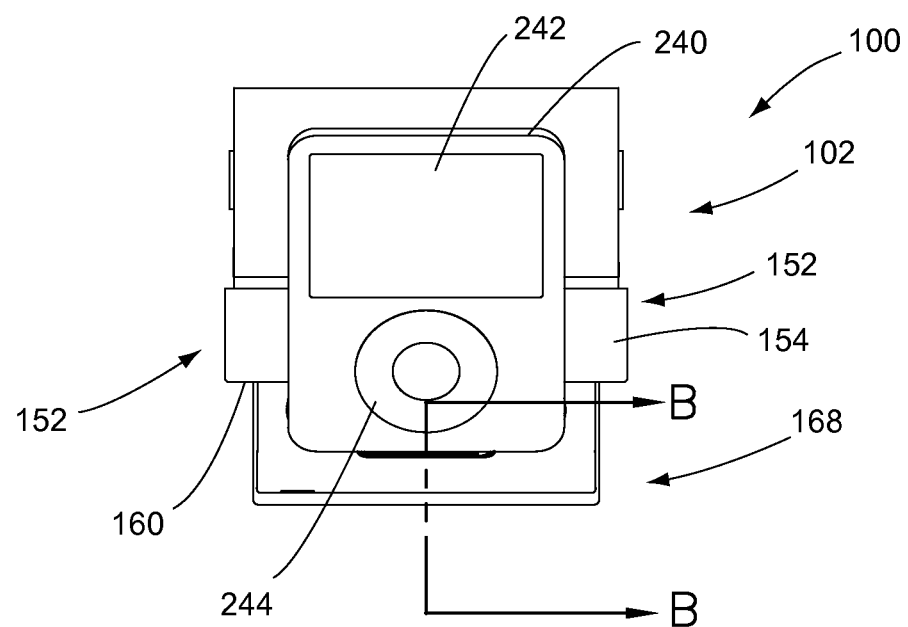
FIG. 11 is an illustration substantially identical to FIG. 10 for the docking station and the hand-held device, and showing the relative location of Section B-B which is utilized with respect to the drawings consisting of FIGS. 25, 26 and 27.

With reference particularly to FIG. 9, showing an exploded view of the docking station 100, the main housing 102 can include an upper housing cover 104 having the configuration shown therein, with a top plate 106. Extending downwardly from each of opposing sides of the top plate 106 are a pair of snap locks 108 (only one of which is shown in FIG. 9). The snap locks 108 each include a lower and outwardly projecting ledge 109, the purposes for which will be described in subsequent paragraphs herein.

Connected to or otherwise integral with the upper housing cover is a front portion 110, also primarily shown in FIG. 9. The front portion 110 includes a top 112 located slightly below the top plate 106 of the upper housing cover 104. The front portion 110 also includes a pair of opposing sides 114 and a back 120. Extending outwardly from each of the opposing sides 114 of the front portion 110 is a vertically disposed side locking boss 116 (only one of which is shown in FIG. 9). In addition to the side locking bosses 116, the top 112 of the front portion 110 also includes a horizontally disposed top locking boss 118. The locking bosses 116 and 118 essentially comprise outwardly directed projections or protrusions having a sufficient resiliency so as to permit the bosses to be utilized for snap fitting releasable locking configurations.

The front portion 110 further includes a pair of pivot slots 122, one each of which is located at the front, lower portions of each of the sides 114. As described in subsequent paragraphs herein, the pivot slots 122 are adapted to receive pivot stubs for purposes of providing the capability of partial rotation of certain other elements of the docking station 100, particularly when electrically and mechanically connected to a hand-held device to be charged. In addition to the pivot slots 122, the front portion 110 also includes a pair of pivot recesses 124. The pivot recesses are located on the inner walls of the opposing sides 114 of the front portion 110. Only one of the pivot recesses 124 is visible in FIG. 9. As will be described in subsequent paragraphs herein, the pivot recesses 124 are adapted to provide the capability of pivotable or rotational movement of certain elements of the docking station 100, so as to provide the docking station 100 with both a closed, retracted position and an open, extended position. Located within the pivot recesses 124 are an open position slot 126 and a retracted position slot 128. The open position slots 126 (only one of which is shown in FIG. 9) cooperate with other elements of the docking station 100 so as to releasably maintain the docking station in an opened position as described in greater detail herein. Correspondingly, the retracted position slots 128 (only one of which is shown in FIG. 9) cooperate with the same elements of the docking station 100 so as to releasably maintain the docking station 100 in a closed or retracted position, also described in greater detail herein.

Turning to other components illustrated in FIG. 9, and further with respect to the main housing 102, located within the main housing 102 is a horizontal circuit board 130 having a planar configuration and adapted to provide a base for various types of circuitry which may be utilized with the docking station 100. The horizontal circuit board 130 includes a pair of opposing circuit board slots 134 which open outwardly on opposing sides of the board 130. The purpose for these slots 134 is to provide a guide and a means for securing the circuit board 130 when it is received within a lower housing cover 136 to be described subsequently herein. The horizontal circuit board 130 can include any of numerous types of circuits. In addition to the horizontal circuit board 130, the docking station 100 may also include a vertical circuit board 132. As shown in FIG. 9, the vertical circuit board 132 also has a planar configuration, but is vertically disposed.

In addition to the foregoing, the main housing 102 further includes a lower housing cover 136 adapted to be secured to the upper housing cover 104. With reference primarily to FIG. 9, the lower housing cover 136 includes a back 138, sides 140 and bottom 142. Located on the inner surfaces of each of the opposing sides 140 is a connecting channel 144. Each of the connecting channels 144 is open at its upper end. Elements such as the connecting channels 144 may be connected to or otherwise integral with the sides 140 of the lower housing cover 136. In addition to the vertically disposed connecting channels 144, positioned inwardly of the opposing sides 140 are a set of four guides 146, two of which are associated with each of the sides 140. Only one pair of guides 146 is illustrated in FIG. 9. The guides 146 will act so as to provide for guidance and stability of the horizontal circuit board 130, when the circuit board is received within the lower housing cover 136. A pair of the guides 146 can also be utilized to align and stabilize the vertical circuit board 132, when the circuit board 132 is received within the lower housing cover 136.

The lower housing cover 136 can also be utilized to house various types of input/output (I/O) connectors, which may be utilized depending upon the particular hand-held device for which the docking station 100 will be used, and the particular functions for which it will be used. For example, for purposes of use of the docking station 100 with various types of hand-held devices, a set of I/O connectors 150A, 150B and 150C may be utilized. As an example, I/O connector 150B could be a video connector, while I/O connector 150C could be an audio connector. Correspondingly, for purposes of securing the I/O connectors 150A, 150B and 150C within the lower housing cover 136, the housing cover 136 can also include a series of circuit apertures 148A, 148B and 148C essentially cut out of the bottom 142 of the housing cover 136. The I/O connectors 150 can be releasably secured within corresponding circuit apertures 148 in any manner considered appropriate, and in a manner well known in the prior art.

Turning to other components of the docking station 100, the station 100 includes a front cover 152, particularly shown in FIG. 9. The front cover 152 is adapted to receive the front portion 110 of the upper housing cover 104. The front cover 152 includes a horizontally disposed top 154, a pair of opposing sides 156, and a bottom 158. The front cover 152 is open at its rear portion and an open central area 162 extends through the cover 152. For purposes of later description with respect to use of the docking station 100 with a hand-held device, it is pointed out that the front cover 152 includes an upper cover edge 160 extending horizontally across the front of the top 154. Also extending through the top 154 is a top locking slot 164. Correspondingly, extending through the opposing sides 156 of the cover 152 are a pair of side locking slots 166. The top locking slot 164 will cooperate with the top locking boss 118, and the side locking slots 166 will cooperate with the slide locking bosses 116, for purposes of releasably securing the front cover 152 to the front portion 110 of the upper housing cover 104.

In addition to the foregoing components, the docking station 100 also includes a forward top cover 168, shown in a stand alone and perspective view in FIG. 9. The forward top cover 168 includes a pair of locking tabs 170, which are adapted for use in releasably securing the forward top cover 168 to other components of the docking station 100. Extending horizontally along the upper portion of the top cover 168 is a top cover edge 172. Below the top cover edge 172 is an arcuate upper front face 174. Extending forwardly and below the upper front face 174 is a further arcuate section 176. Extending downwardly and vertically disposed from the arcuate section 176 is a lower front face 178. As particularly as shown in FIG. 9, extending through the arcuate section 176 is a connector slot 180. The slot 180 is adapted to allow for a hand-held device to be mechanically and electrically connected to other components of the docking station 100.

A further component associated with the docking station 100 is characterized herein as a rotatable base door 182, again shown in somewhat of a stand alone configuration in FIG. 9. The rotatable base door 182 is adapted to support charging elements of the docking station 100, as well as provide a means for positioning the charging components of the docking station 100 between a closed, retracted position and an open, extended position. Turning to the elements of the rotatable base door 182, the door 182 includes a horizontal, central section 184. Positioned within the horizontal central section 184 is a connector slot 190. The connector slot 190 is adapted, if desired by the user, to provide for a forward positioned electrical connector, such as the video connector 192 also illustrated in FIG. 9. The video connector 192 can be attached to appropriate electrical wiring elsewhere in the docking station 100, and the front portion of the connector 192 can extend through the front plug 194 of the forward top cover 168.

In addition to the horizontal, central section 184, the rotatable base door 182 also includes an angled forward section 186. Positioned on the angled forward section 186, at the rear thereof, is a seat 188. The seat 188 is essentially formed of a series of raised slots which can be utilized to facilitate the securing and alignment of other elements of the docking station 100. At the rear portion of the rotatable base door 182 are a pair of opposing pivot stubs 196, extending outwardly from each side of the base door 182. The pivot stubs 196 are adapted to be releasably secured within the pivot slots 122. The cooperation of the pivot slots 122 and the pivot stubs 196 provide for an axis of rotation when it is desired to move the rotatable base door 182 between extended and retracted positions. In addition to the pivot stubs 196, the rotatable base door 182 also includes a pair of locking tabs 198, extending upwardly from the rear portion of the door 182. The locking tabs 198 cooperate with the corresponding locking tabs 170 of the forward top cover 168, so as to provide a means for releasably securing the forward top cover 168 to the base door 182. However, it should be emphasized that various types of connectors and locking means can be utilized for this and other connections herein, without departing from the principal concepts of the invention.

In addition to the foregoing elements, the rotatable base door 182 also includes a pair of forward pivot slots 202. The forward pivot slots 202 are primarily shown in FIG. 9. The pivot slots 202 are located at the forward portion of the horizontal, central section 184. The pivot slots 202 are adapted to receive pivot stubs of a connector element to be described subsequently herein, for purposes of allowing a rocking or partial rotation of the connector element.

As further shown in particular in FIG. 9, the docking station 100 also includes a device connector assembly 204 having the individual components shown in exploded view in FIG. 9. The device connector assembly 204 provides a means for electrically and mechanically coupling the docking station 100 to the hand-held device (not shown in FIG. 9) to be charged or from which data is to be transmitted to or from. For purposes of brevity of description, reference will be made in the following paragraphs solely to the concept of utilizing the docking station 100 to charge the hand-held device (not shown in FIG. 9). However, it should be emphasized that signals other than charging power signals may be transmitted to or from the hand-held device through the docking station 100. This is made somewhat apparent from the previous description herein with respect to connector devices such as devices 150A, 150B and 150C.

The device connector assembly 204 includes a connector cover 206 having somewhat of a trapezoidal or frustrum configuration, as also shown in FIG. 9. Extending vertically through the connector cover 206 is a slot 208. A further element of the device connector assembly 204 is the connector 210. The connector 210 includes an upwardly projecting portion 211. Extending through the upwardly projecting portion 211 is a series of connector pins 216. The connector pins 216 and the upwardly projecting portion 211 will extend upwardly through the slot 208, in a manner so as to be electrically connectable to the hand-held device to be charged.

Extending upwardly on opposing sides of the top of the upwardly projecting portion 211 are a pair of nubs 212. The nubs 212 are utilized to assist in aligning and releasably securing the connector 210 to the hand-held device (not shown) to be charged. The upwardly projecting portion 211 of the connector 210 is connected to or otherwise integral with a horizontally disposed connector base 214.

In addition to the foregoing elements, the device connector assembly 204 can also include a conventional ribbon wire 218 having a terminal connector 220, as partially shown in FIG. 9. The connector 220 will have electrical conductors therein adapted to be electrically connected to the connector pins 216 associated with the connector 210. In addition to the ribbon wire 218, and as also further shown in FIG. 9, the docking station 100 and the device connector assembly 204 further includes a pivot assembly 222, as particularly shown in FIG. 9. The pivot assembly 222 is utilized as an element which will have the capability of pivoting for purposes of appropriately accommodating hand-held devices of various sizes. The pivot assembly 222 includes a substantially horizontal recessed area 224. The recessed area 224 is adapted to receive the connector 220 of the ribbon wire 218 and the connector base 214 of the connector 210. The recessed area 224 is enclosed on its left and right areas by sides 226, and is further enclosed at the front portion thereof by a front face 228. Extending outwardly from each of these sides 226 is a pivot axle 230. The pivot axles 230 are adapted to be rotatably received within the forward pivot slots 202 of the rotatable base door 182. The pivoting action provided by the pivot axles 230 facilitate use of hand-held devices of various sizes with the docking station 100, and also assist in preventing tipping motions of the hand-held devices which may act to disturb electrical connections between the docking station 100 and the hand-held devices.

In addition to the foregoing elements, the docking station 100 and the device connector assembly 204 may also include a foam block 232 as further shown in FIG. 9. The foam block 232 may have a substantially rectangular shape, but should be sufficiently pliant so that its shape is effected by the weight of a hand-held device (not shown) and other elements of the docking station 100 which will exert downwardly directed forces on the foam block 232. The foam block 232 provides a means for exerting appropriate forces on the pivot assembly 232 and connector 210 so as to maintain an appropriate stability, regardless of the thickness of the device itself As will be described in subsequent paragraphs herein, the functions of the foam block 232 can be accomplished by using means other than the foam block 232, such as springs or the like.

In assembly, the upper housing cover 104 can be secured to the lower housing cover 136 by extending the snap locks 108 through the corresponding connecting channels 144. The snap locks 108 can be sized so that some inwardly directed pressure is required on the snap ledges 109 so as to move the ledges 109 through the connecting channels 144. When the ledges 109 extend a sufficient distance downwardly into the connecting channels 144, they are allowed to spring outwardly into the recessed areas 111 (only one of which is shown in FIG. 9), so as to be releasably locked therein. Correspondingly, the vertical circuit board 132 and the horizontal circuit board 130 can be extended downwardly into the lower housing cover 136. The horizontal circuit board 130 can be locked within the lower housing cover 136 by the alignment of the connecting channels 144 with the circuit board slots 134. Correspondingly, with the vertical circuit board 132, the circuit board can be appropriately positioned adjacent and between connecting channels 144 and guides 146. The I/O connectors 150A, 150B and 150C can also be appropriately positioned within corresponding circuit apertures 148.

For further assembly, the rotatable base door 182 can be extended completely through the open central area 162 of the front cover 152 (although such insertion through the central area 162 may require the rotatable base door 182 to be angled somewhat). The rotatable base door 182 can then be coupled to the front portion 110 of the upper housing 104, with the pivot stubs 196 being pivotably received within the pivot slots 122. For further coupling of the rotatable base door 182 to the front portion 110, the pivot bosses 200 associated with the rotatable base door 182 can be snap fitted within the corresponding open position slots 126 associated with the pivot recesses 124 of the front portion 110.

For purposes of then securing the front cover 152 to the upper housing cover 104, the front cover 152 can be extended toward the front of the front portion 110. The top 154 will extend over the top 112 of the upper housing cover 104, and the top locking boss 118 will resiliently be snap fitted within the top locking slot 164. Correspondingly, the side locking bosses 116 of the upper housing cover 104 will be resiliently snap fitted within the side locking slots 166 of the front cover 152.

Still further, the video connector 192 can be positioned within the connector slot 190 of the rotatable base door 182. The device connector assembly 204 can then be assembled with the foam block 232 positioned on the seat 188 of the rotatable base door 182. Positioned above the foam block 232 will be the pivot assembly 222. Positioned within the horizontal recessed area 224 will be the ribbon wire 218, specifically the connector 220 thereof. Positioned over the ribbon wire 218 and within the horizontal recessed area 224 of the pivot assembly 222 is the connector 210. The connector cover 206 can be received over the upwardly projecting portion 211 of the connector 210, and secured thereto by any suitable means. The connector pins 216 and the nubs 212 will extend upwardly through the slot 208 of the connector cover 206. With the device connector assembly 204 positioned on the seat 188 of the rotatable base door 182, the forward top cover 168 can then be positioned over the rotatable base door 182, with the upwardly projecting section 211 of the device connector assembly 204 (along with the connector cover 206) extending through the connector slot 180 of the forward top cover 168. To secure the forward top cover 168, the locking tabs 170 of the forward top cover 168 can be appropriately and cooperatively secured to the locking tabs 198 associated with the rotatable base door 182.

In accordance with the foregoing, the docking station 100 is assembled in its entirety.

It should be emphasized that the foregoing description included various types of coupling and connecting elements for various components of the docking station 100. It should be emphasized that numerous other types of connecting arrangements may be utilized, without departing from the principal concepts of the invention.

As further described herein, the docking station 100 is adapted to be used for purposes of charging a hand-held device, such as the hand-held device 240 illustrated in a number of the drawings, including FIGS. 10-27. The hand-held device 240 may be in the form of a cell phone, camera, personal data assistant or a number of other types of devices. The hand-held device 148 is illustrated, for example, in FIGS. 10 and 11 as including a monitor screen 242 and a set of controls 244.

As earlier stated herein, a primary concept associated with docking stations in accordance with the invention relate to the capability of accommodating hand-held devices of various sizes and shapes, including those having differing thicknesses. Accordingly, for purposes of description, examples will be shown of the hand-held device 240 with three thicknesses. For this purpose, reference will be made to three separate hand-held devices, identified herein as devices 240A, 240B and 240C. These individual hand-held devices 240 are illustrated in FIG. 12 as positioned on the docking station 100 for purposes of charging.

Figure 12:
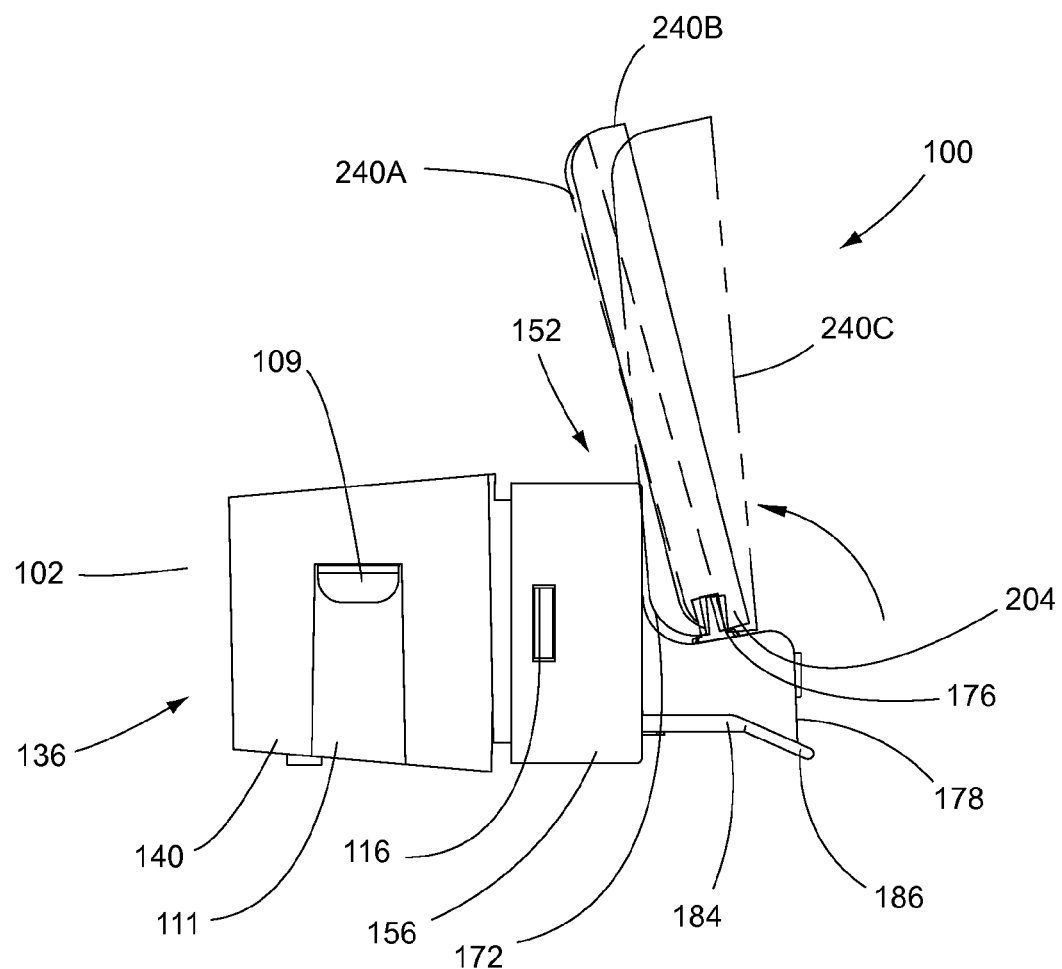
FIG. 12 is a left side view of the docking station shown in FIG. 2, and showing the relative location of interconnected hand-held devices.

With reference to FIG. 12, the "thinnest" hand-held device is designated as device 240A, and is shown in phantom line format in FIG. 12. An intermediate thickness device 240 is designated as device 240B, and is shown in solid line format in FIG. 12. The thickest device is illustrated in FIG. 12 in phantom line format as device 240C. As further shown in FIGS. 10, 11 and 12, a concept associated with the docking station 100 in accordance with the invention is that when the particular hand-held device 240 is inserted onto the connector 210, the device 240 will be initially tilted rearwardly, toward the upper cover edge 160 of the front cover 152. This tilting configuration and urging of the device 240 rearwardly in the absence of any external forces assist in providing stability to the device 240 while it is in a charging mode on the docking station 100. Further, the upper cover edge 160 provides for a "stop" so as to prevent the particular device 240 from tilting rearwardly to the extent that the electrical and/or mechanical connections between the device 240 and the device connector assembly 204 would be disturbed.

Reference is now made to FIGS. 13-18. Specifically, as shown in FIGS. 13 and 14, if the relatively thinnest hand-held device 240A is inserted onto the connector 210, its elongated configuration will be slightly away from the front cover edge 160. The foam block 232 will actually act so as to urge the device 240A away from the upper cover edge 160. With the somewhat thicker (and likely heavier) device 240B, as shown in FIGS. 15 and 16, the device 240B will stabilize at a location somewhat closer to the upper cover edge 160. Correspondingly, with a substantially thick device 240C, the stable position for this device may actually be one where the device 240C abuts the upper cover edge 160.

As earlier stated, one of the advantages of the docking station 100 in accordance with the invention is that it is structured so as to prevent the hand-held device 240 from tilting rearwardly to an extent such that the electrical mechanical coupling to the connector 210 and device connector assembly 204 would be disturbed. FIGS. 19, 21 and 23 are illustrations where it is assumed that a force is being exerted on the upper portion of each of the devices 240A, 240B and 240C, respectively. These forces are exerted in a direction toward the rear of the docking station 100. As shown therein, although these disturbing external forces are being exerted, the hand-held devices will tilt rearwardly only to the extent that they abut the upper cover edge 160. This permits the electrical mechanical coupling of the connector 210 and the connector assembly 204 with the hand-held device 240 to remain in a sufficient position so as to provide for appropriate charging. Again, it should be emphasized that with the action of the foam block 232, the foam block 232 acts so as to stabilize the hand-held device 240 when it is in a charging position.

Figure 25:
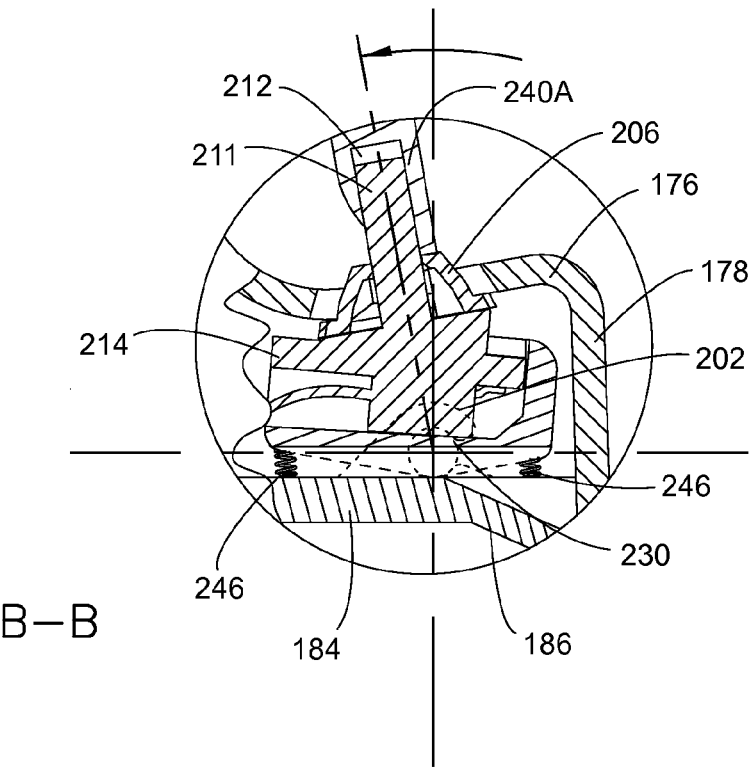
FIG. 25 is an enlarged view of a portion of the interconnection between the hand-held device and the docking station, taken along section lines B-B of FIG. 11, and showing the use of springs, in place of a foam block.
Figure 26:
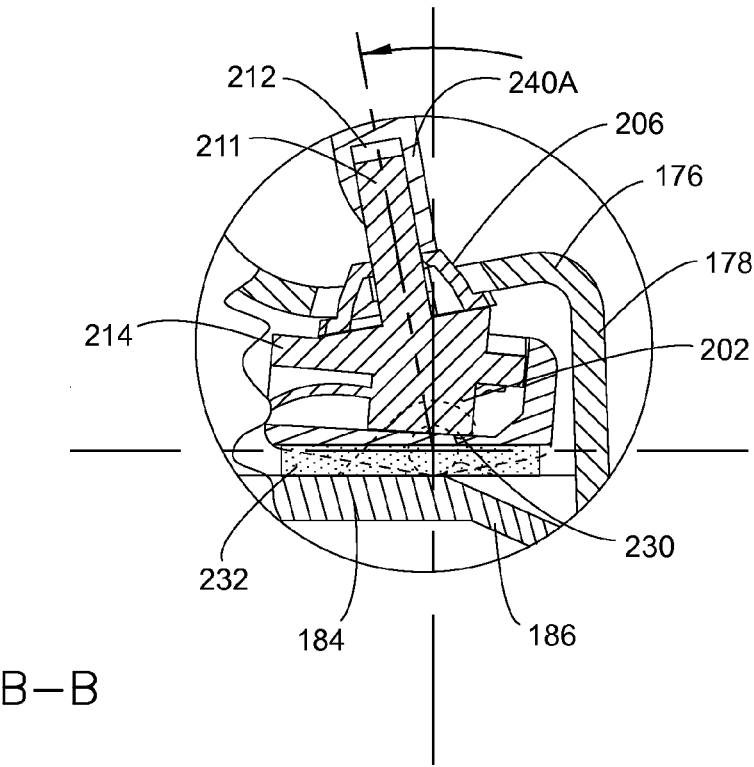
FIG. 26 is an enlarged, sectional view similar to FIG. 25, taken along section lines B-B of FIG. 11, and showing the hand-held device as being utilized with the docking station having a foam block.

Further with respect to the invention, it should be noted that devices other than the foam block 232 may be utilized in accordance with the invention, without departing from certain of the principal novel concepts of the invention. For example, in place of the foam block 232, FIG. 25 illustrates the use of a set of springs 246 which may be utilized for purposes of exerting the appropriate forces on the pivot assembly 222 during use of the docking station 100.

Figure 27:
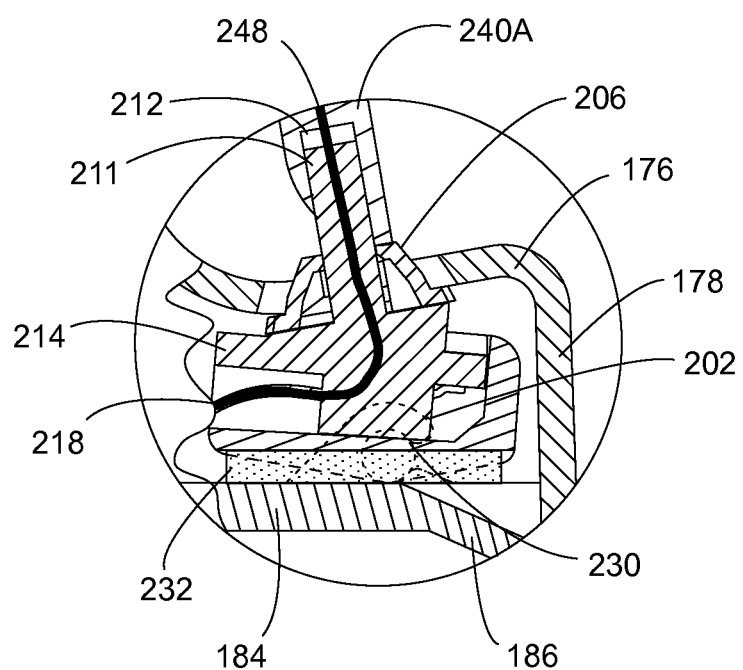
FIG. 27 is an enlarged and sectional view of a hand-held device and docking station in accordance with the invention, similar to FIG. 26, but further showing the electrical connection of a ribbon cable of the docking station with electrical wiring of the hand-held device.

Still further, for purposes of completeness of showing the embodiment of the docking station 100 in accordance with the invention, FIG. 27 illustrates the use of the hand-held device 240 on the docking station 100, and particularly shows an electrical connection 248 which may be utilized for purposes of connecting to or otherwise being part of the ribbon cable 218.

Figure 28:
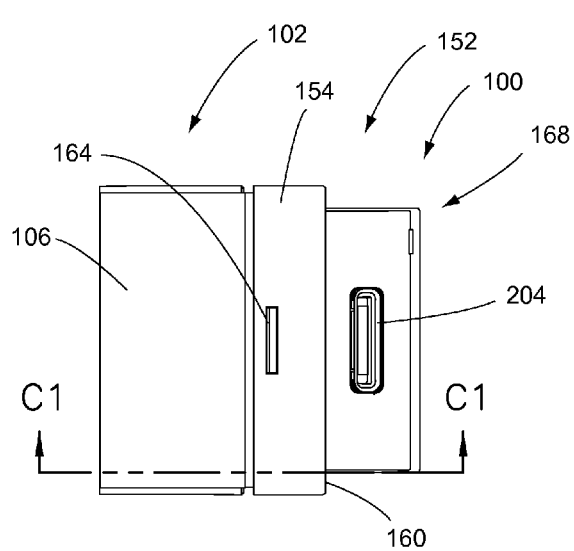
FIG. 28 is a plan view of the docking station in accordance with the invention, similar to FIG. 3 and showing the docking station in an open or extended position.
Figure 30:
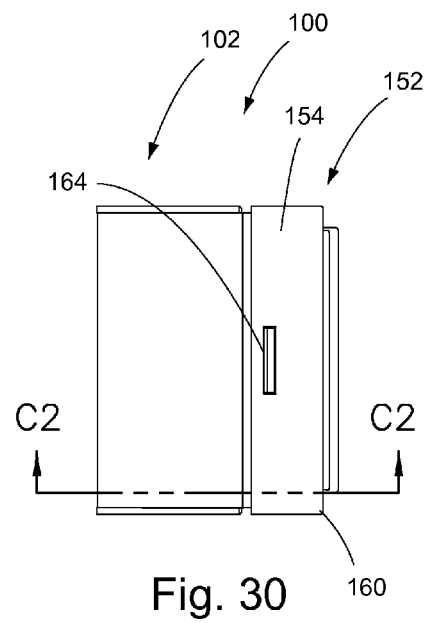
FIG. 30 is a plan view of the docking station shown in FIG. 28, but showing the docking station in a retracted or closed position.
Figure 29:
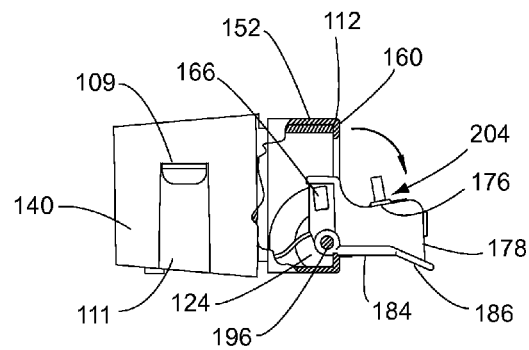
FIG. 29 is a left side, sectional view of the docking station shown in FIG. 28, taken along section lines C1-C1 of FIG. 28.
Figure 31:
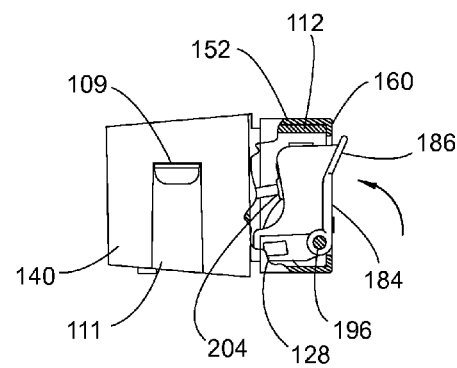
FIG. 31 is a left side, sectional view of the docking station shown in FIG. 30, taken along section lines C2-C2 of FIG. 30.

FIGS. 28-31 illustrate concepts associated with the rotatable base door 182 (and interconnected device connector assembly 204) being capable of being moved between an extended, open position (where the device connector assembly 204 is available for charging) in a retracted, closed position (where the device connector assembly 204 is substantially hidden from view). FIGS. 28 and 29 illustrate the extended, opened position, while FIGS. 30 and 31 illustrate the retracted, closed position. As particularly shown in FIG. 29, and with reference again to FIG. 9, when the device connector assembly 204 and associated rotatable base door 182 is in an opened position, the pivot bosses 200 are releasably secured (in a snap fit arrangement) within the open position slots 126. The cooperation of the bosses 200 and the open position slots 126 maintain the rotatable base door 182 and device connector assembly 204 in a stable position. To retract the rotatable base door 182 and device connector assembly 204, the user can exert upwardly directed forces on the angled forward section 186 of the rotatable base door 182. These forces will cause the pivot bosses 200 to be released from the open position slots 126. The pivot bosses 200 will then travel in a curved path until the bosses 200 encounter the retracted position slots 128. Additional forces exerted on the angled forward section 186 (as shown in FIG. 31) will cause the bosses 200 to be resiliently received and snap fitted within the retracted position slots 128. With this configuration, the rotatable base door 182 and associated device connector assembly 204 will be maintained in a closed, retracted position, until a user would exert outwardly directed forces on the angled forward section 186.

In accordance with certain aspects of the invention, the docking station 100 is adapted to be used not only in a stand alone configuration, but also with various other electrical apparatus. For example, FIGS. 32-39 illustrate the use of the docking station 100 with two different embodiments of power and data centers. A first power and data center, which can be characterized as an expandable power and data center is illustrated as center 250 in FIGS. 32-37, and 39. The power and data center 250 will not be described in substantial detail herein. The center 250 is adapted to provide power receptacles for energizing electrical devices, and data connectors for communications interconnection to communication devices. The center 250 is also adapted to provide means for maintaining the power and data center in a closed, retracted position, or in an opened, extended position. The general concepts associated with the power and data center 250 are disclosed in international patent application Publication No. 2006/138285, published Dec. 28, 2006. The published application is titled ONE TOUCH PIVOTING EXPANDABLE POWER AND DATA CENTER. In view of this known power and data center, details associated with the same will not be described herein. With reference to the drawings, the power and data center 250 may, for example, comprise a work surface of a furniture component. The power and data center 250 can include a stationary housing 252, which may comprise a rectangular sleeve or casing 254. The rectangular sleeve 254 is vertically disposed and includes a frontal wall 256, left side wall 258 and right side wall 260. A rear vertical wall 262 is also shown.

Figure 32:
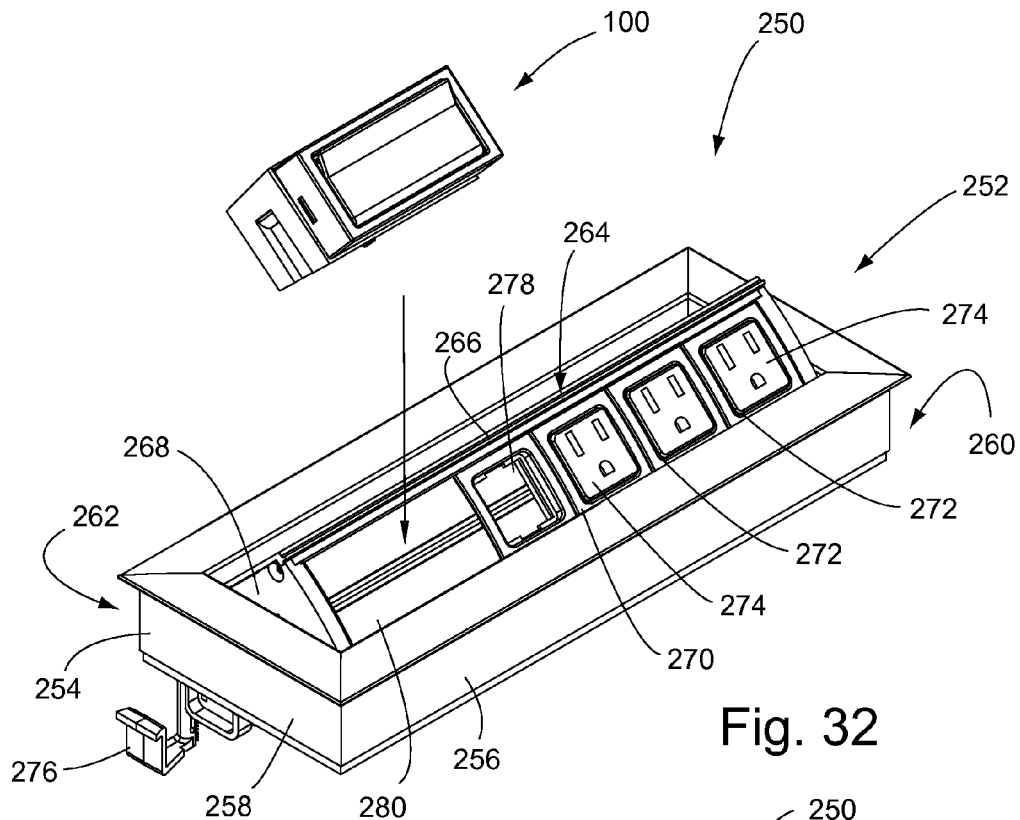
FIG. 32 is a perspective view of a power and data center, and showing the position within which a docking station in accordance with the invention may be inserted.

The power and data center 250 also includes a carriage 264. The carriage 264 includes a top surface 266, sides 268 and frontal face 270. Extending outwardly from the frontal face 270 is a set of windows 272. The windows 272 can be varied in number, and comprise socket areas where electrical and communication devices such as power receptacles and data ports can be inserted. For example, in FIG. 32, three of the windows 272 include three power receptacles 274. Correspondingly, one of the windows 272 is adapted to receive a data port 278. In addition to the foregoing, the power and data center 250 can also include a pair of locking cams 280 (one of which is shown in FIG. 32). The locking cams can be utilized for purposes of securing the power and data center 250 to a work surface or the like.

Figure 33:
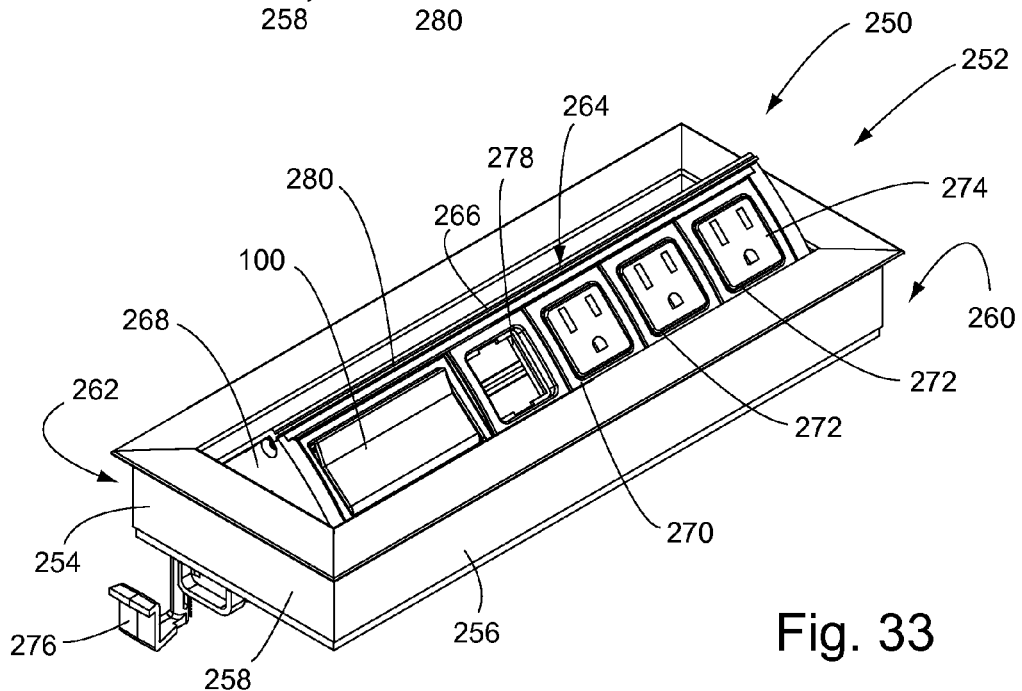
FIG. 33 is a perspective view similar to FIG. 32, but showing the docking station in a fully assembled position with the power and data center.
Figure 34:
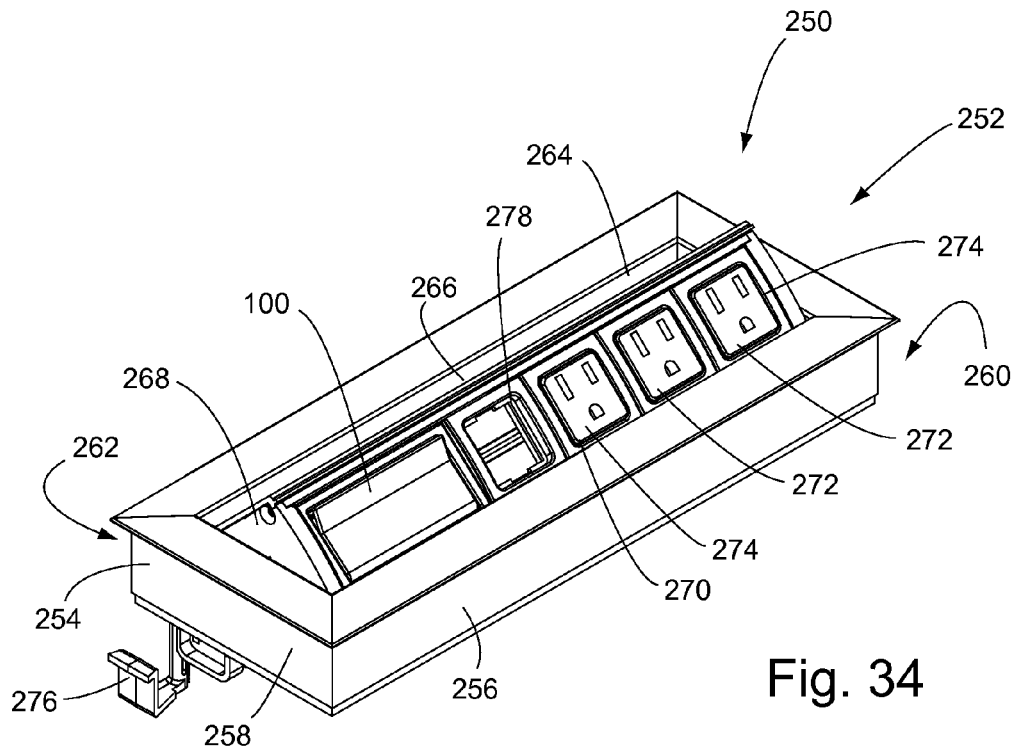
FIG. 34 is a perspective view of a power and data center having a docking station in accordance with the invention assembled therein, similar to the view of FIG. 33, and with FIG. 34 showing the docking station in a closed or retracted position.
Figure 35:
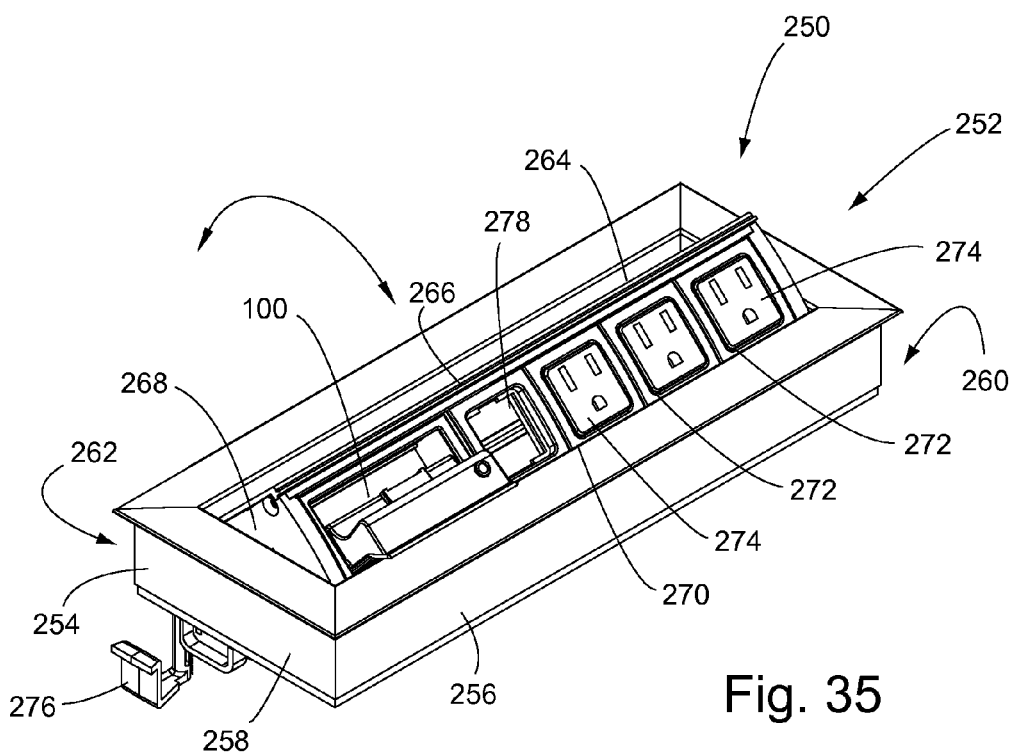
FIG. 35 is a perspective view similar to FIG. 34, but showing the docking station in an open or extended position.

As further shown in the drawings, the power and data center 250 includes a docking station window 280. The docking station window 280 is adapted to receive the docking station 100. Appropriate electrical connections can then be made between the docking station 100 and other electrical apparatus (not shown) for purposes of providing a charging station within the power and data center 250 for purposes of charging devices such as the hand-held devices 240. While FIG. 32 shows the relative positioning of the docking station 100 as it is positioned to be assembled within the docking station window 280, FIG. 33 shows the docking station 100 assembled within the power and data center 250. Further, FIG. 33 shows the docking station 100 with the rotatable base door 182 in a closed and retracted position. FIG. 34 is similar to FIG. 33. FIG. 35 illustrates the relative positioning of the docking station 100 within the docking station window 280, and with the docking station having the rotatable base door 182 in an opened, extended position.

Figure 36:
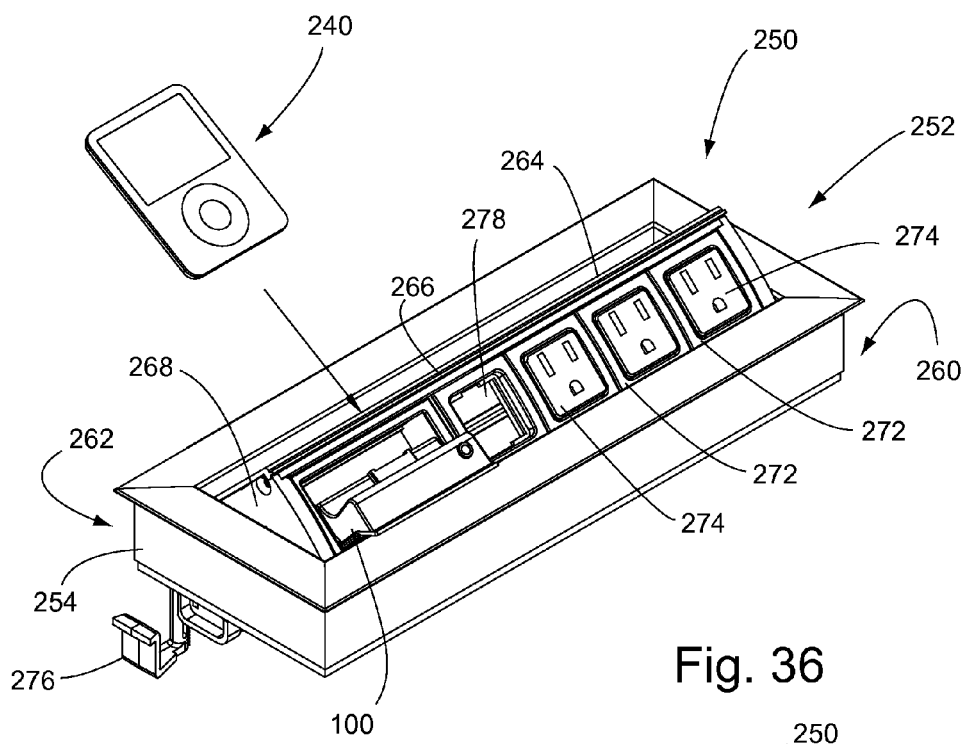
FIG. 36 is a perspective view of a docking station and power and data center similar to FIG. 35, and showing the relative positioning of a hand-held device as the device is to be inserted into the docking station for charging.
Figure 37:
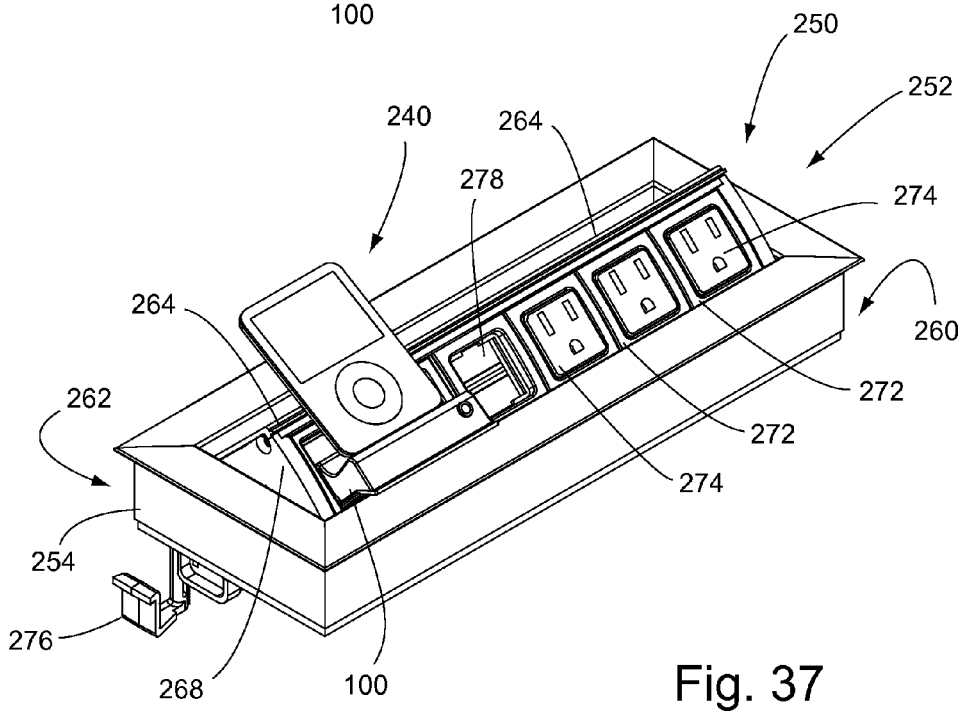
FIG. 37 is a perspective view of the power and data center and docking station, similar to FIG. 36 but showing the hand-held device as being inserted into the docking station for purposes of charging.

Correspondingly, FIG. 36 illustrates the power and data center 250 with the docking station 100 assembled within the docking station window 280. The docking station 100 is in an opened, extended position, and a hand-held device is shown in its position to be electrically and mechanically coupled to the docking station 100. FIG. 37 illustrates the power and data center 250 with the hand-held device 240 being electrically coupled to the docking station 100.

Figure 38:
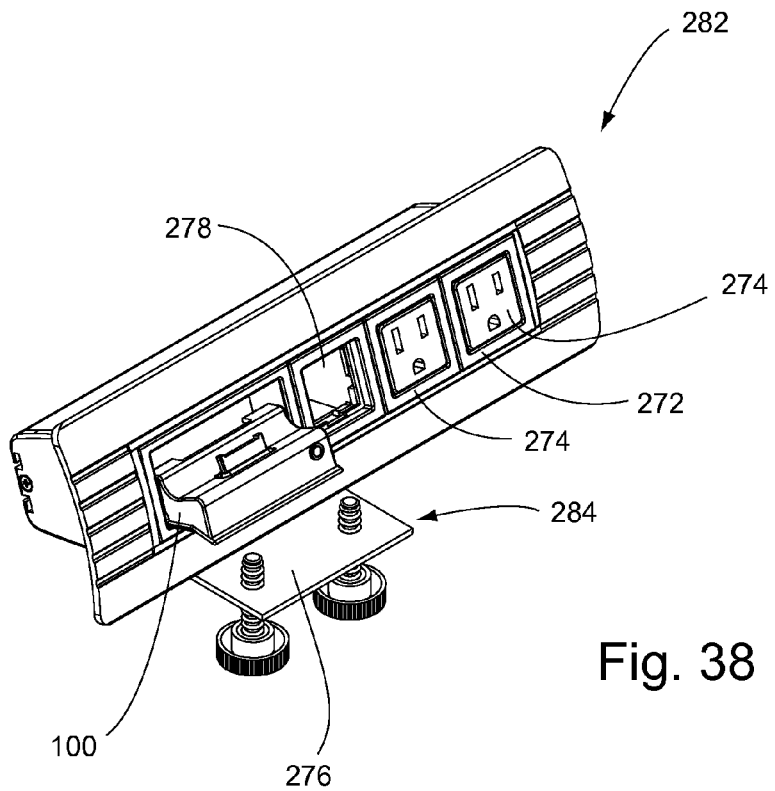
FIG. 38 is a perspective view of an alternative embodiment of a power and data center assembled with a docking station in accordance with the invention.
Figure 39:
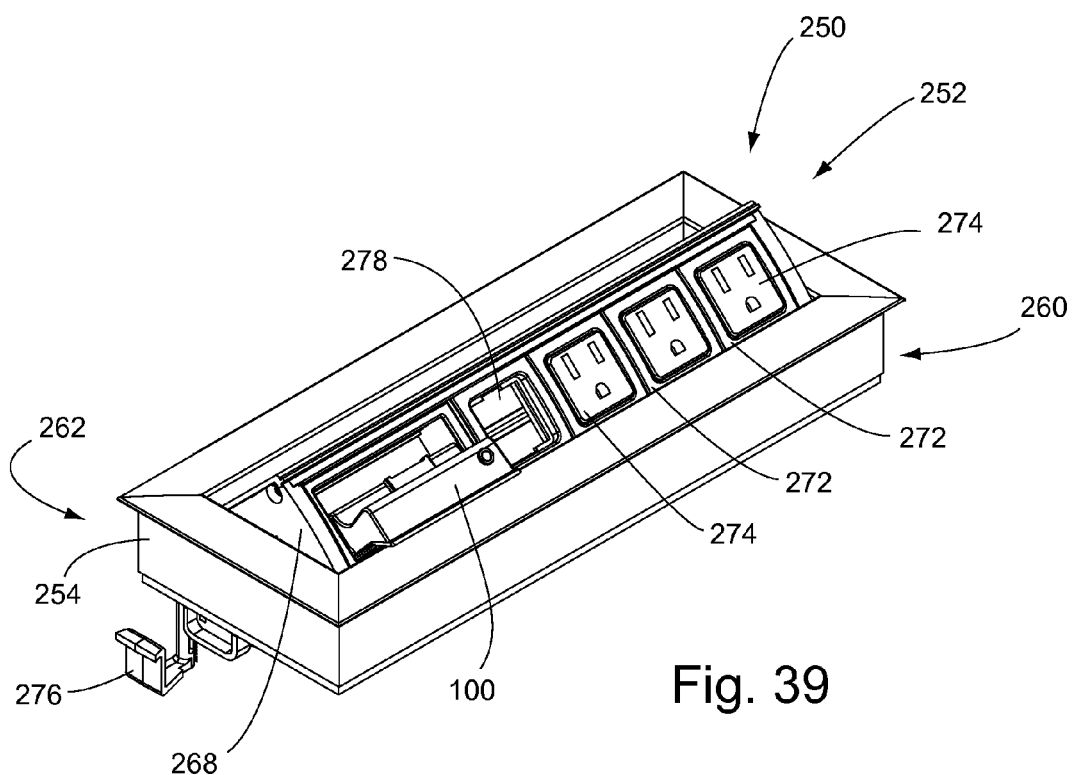
FIG. 39 is a further view of a docking station and a power and data center, with the docking station assembled in the power and data center in accordance with the invention, and similar to the view of FIG. 36.

FIG. 38 illustrates a further embodiment of a power and data center 282 which may be utilized with the docking station 100. The previously described power and data center 250 is adapted to be positioned between opened and closed positions, while the power and data center 282 remains in an open position. The power and data center 282 also includes a series of clamps 284 which can be utilized to secure the power and data center to the edge of a work surface. The general concepts of the power and data center 282 (absent the docking station 100) are disclosed in International Application Publication No. 2006/138258 published Dec. 28, 2006. For purposes of brevity in description, components of the power and data center 282 which functionally correspond to elements of the power and data center 250 are numbered with like numbers. FIG. 39 illustrates the power and data center 250, with the docking station 100 in a opened position, similar to FIG. 35.

It will be apparent to those skilled in the pertinent arts that still other embodiments of docking stations in accordance with the invention can be designed. That is the principles of docking stations in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

What is claimed is:

1. A docking station for charging or otherwise transmitting or receiving electrical signals to or from an electronic device, said docking station comprises:
    a main housing;
    circuit components positioned within said housing for transmitting and/or receiving electrical signals to and/or from said electronic device, said electrical signals being in the form of power and/or communication signals;
    a device connector assembly coupled to said main housing and electrically connected to said circuit components for releasably, mechanically, and electrically coupling said electronic device to said docking station;
    means associated with said main housing for providing a stop in the form of an upper edge of a front cover of said docking station;
    without requiring any positioning of any said electronic devices against a forward wall of said docking station, so that when said electronic device is mechanically and electrically coupled to said docking station, said electronic device is prevented from tilting rearwardly to an extent that said mechanical and electrical coupling of said electronic device to said docking station would be disturbed; and
    said device connector assembly is structured so as to accommodate different ones of said electronic devices having differing thicknesses; and
    a power and data center is combined with said docking station so that said docking station is inserted into said power and data center in a fully assembled state.

2. A docking station in accordance with claim 1, characterized in that said device connector assembly further comprises a pivot assembly pivotally coupled to said docking station, so that when said electronic device is mechanically and electrically coupled to said docking station, said pivot assembly will pivot in correspondence with any pivoting motion of said electronic device.

3. A docking station in accordance with claim 2, characterized in that said docking station further comprises a base door coupled to said main housing, and said pivot assembly is directly and pivotally coupled to said base door.

4. A docking station in accordance with claim 3, characterized in that said base door is rotatably coupled to said main housing.

5. A docking station in accordance with claim 1, characterized in that said device connector assembly is structured so that when said electronic device is mechanically and electrically coupled to said docking station, said electronic device is initially tilted rearwardly towards said main housing, so as to assist in providing stability to said electronic device.

6. A docking station in accordance with claim 1, characterized in that said device connector assembly comprises force means for exerting forces against said electronic device when said electronic device is mechanically and electrically coupled to said docking station, and when disturbing external forces are applied against said docking station.

7. A docking station in accordance with claim 6, characterized in that said force means comprises a foam block.

8. A docking station in accordance with claim 6, characterized in that said force means comprises a plurality of springs.

9. A docking station in accordance with claim 1, characterized in that said docking station comprises stop means for preventing said electronic device, when said electronic device is mechanically and electrically coupled to said docking station, from tilting rearwardly to the extent that electrical and/or mechanical connections between said electronic device and said device connector assembly would be disturbed.

10. A docking station in accordance with claim 1, characterized in that said device connector assembly comprises:
    a connector for electrically connecting said docking station to said electronic device;
    electrical means for electrically connecting said circuit components to said connector;
    a pivot assembly pivotally coupled to said docking station and operably coupled to said connector so as to pivot in unison with said connector; and
    resilient means positioned below said pivot assembly for exerting forces upwardly against said pivot assembly.

11. A docking station in accordance with claim 10, characterized in that said docking station further comprises a rotatable base door coupled to said main housing and capable of movement between an extended position and a refracted position, said rotatable base door being in an extended position when said electronic device is mechanically and electrically coupled to said docking station.

12. A docking station in accordance with claim 11, characterized in that said pivot assembly is pivotally coupled to said rotatable base door.

13. A docking station in accordance with claim 12, characterized in that said pivot assembly comprises:
    a substantially horizontal recessed area, said recessed area adapted to receive an electrical connector of said electrical means and a connector base of said connector;
    left and right sides enclosing said recessed area;

a pair of pivot axles extending outwardly from each of said left and right sides, with said pivot axles rotatably received within pivot slots of said rotatable base door.

14. A docking station in accordance with claim 13, characterized in that said pivot assembly is structured so that when one of said electronic devices having a predetermined thickness is inserted onto said connector, an elongated configuration of said electronic device will be positioned slightly away from a front and upper cover edge of said docking station, and said resilient means will act so as to urge said electronic device away from said upper cover edge.

15. A docking station in accordance with claim 1, characterized in that: said main housing comprises a rotatable base door being capable of movement between an extended, open position where said device connector assembly is available for use, and a retracted, closed position, where said device connector assembly is hidden from view.

16. A docking station in accordance with claim 1, characterized in that said docking station comprises video and audio connectors.

17. A docking station in accordance with claim 1, characterized in that said electronic device may be a cell phone, camera, or personal data assistant.

* * * * *

UNITED STATES PATENT AND TRADEMARK OFFICE
CERTIFICATE OF CORRECTION

| | |
|---|---|
| PATENT NO. | : 8,482,252 B2 |
| APPLICATION NO. | : 12/997166 |
| DATED | : July 9, 2013 |
| INVENTOR(S) | : Norman R. Byrne |

It is certified that error appears in the above-identified patent and that said Letters Patent is hereby corrected as shown below:

Title Page

Item (73) Assignee: Please delete the Assignee Data. (No Assignment Data)

Signed and Sealed this
Fifth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,482,252 B2  Page 1 of 1
APPLICATION NO. : 12/997166
DATED : July 9, 2013
INVENTOR(S) : Norman R. Byrne It is certified that error appears in the above-identified patent and that said Letters Patent is hereby corrected as shown below:

Title Page,
Item [73], Assignee, "Byrne Electrical Specialists, Inc., Rockford, MI (US)" (deleted from title page of patent in the Certificate of Correction issued August 5, 2014) is inserted and patent is returned to its original state where there is an assignee displayed on the title page of patent.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,482,252 B2  
APPLICATION NO.    : 12/997166  
DATED              : July 9, 2013  
INVENTOR(S)        : Norman R. Byrne Page 1 of 1

It is certified that error appears in the above-identified patent and that said Letters Patent is hereby corrected as shown below:

Title Page, below Item (54) change "(75) Inventor" to read --(76) Inventor--.

Title Page, below Item (75), delete "(73) Byrne Electrical Specialists, Inc., Rockford, MI (US)".

Signed and Sealed this  
Fourteenth Day of October, 2014

Michelle K. Lee  
*Deputy Director of the United States Patent and Trademark Office*